United States Patent [19]

Malatto

[11] 4,131,008
[45] Dec. 26, 1978

[54] DEVICE FOR MEASURING THE BENDING ANGLES IN PLATE-BENDING MACHINES

[75] Inventor: Renzo Malatto, Milan, Italy

[73] Assignee: Selecontrol S.A.S., Lecco (Como), Italy

[21] Appl. No.: 873,529

[22] Filed: Jan. 30, 1978

[30] Foreign Application Priority Data

Feb. 1, 1977 [IT] Italy .................................. 7202 A/77

[51] Int. Cl.² .............................................. B21D 7/06
[52] U.S. Cl. .................................................... 72/389
[58] Field of Search .................... 72/389, 385, 386, 31, 72/32, 34, 10

[56] References Cited

U.S. PATENT DOCUMENTS

| 3,146,819 | 9/1964 | Van Endert | 72/389 |
| 3,844,156 | 10/1974 | Hanni | 72/389 |
| 3,943,746 | 3/1976 | Eitel | 72/389 |
| 3,978,706 | 9/1976 | Nakagawa | 72/389 |

Primary Examiner—Lowell A. Larson
Assistant Examiner—Gene P. Crosby
Attorney, Agent, or Firm—Holman & Stern

[57] ABSTRACT

For a sheet-metal bending press of the kind in which the coaction of a die and a punch causes the metal plate to be bent at an angle, a device is provided, which is capable of detecting the angle of bend of the plate being machined in a continuous way and of generating a signal which has a magnitude proportional to the angle width. The signal can be used either as a continuous angle-checking means, or for driving the automatized operation of the press, or for both functions. The necessity of removing the plate to be bent angularly in order to check the angle progressively produced is entirely eliminated. A zero method can be adopted for taking readings when the front surface of the detector proper of the angle is not exactly coplanar with the resting surface for the plate on the press bed.

6 Claims, 5 Drawing Figures

DEVICE FOR MEASURING THE BENDING ANGLES IN PLATE-BENDING MACHINES

This invention relates to a device for measuring the bending angles in plate-bending presses. The invention applies to that class of bending presses which perform a so-called "in-air" bending, that is a bending after which the metal sheet retains a fraction of its resiliency, which is displayed by an elastic rebound as the force which has caused the deformation has ceased. It is therefore necessary to effect, with such presses, a bending at a narrower angle than that which is finally expected.

Bending presses of this kind comprise, as is known, a die, a punch and means adapted to bring about the relative movement between the die and the punch.

The die has a resting plane for the metal plate to be bent, said plane being interrupted by a longitudinal groove, for example in the form of a "V" or having a rectangular cross-sectional outline, with the edges properly radiussed to such resting plane.

the punch has a "counter-V" shaped point which is aligned with the die groove and, when the punch and the die are approached to one another, the punch point causes the metal sheet to match the "V"-shaped groove of the die and bends the metal sheet. The angle of bend can be varied and, during progress of the bending step, one surface of the plate rests on the radiussed edges of the "V"-shaped die groove whereas the other surface rests against the "counter-V" punch edge point.

The paramount importance of being enabled to detect and thus to adjust the angle of bend in bending presses of the kind referred to above is self-evident.

A number of devices have been suggested, having the task of setting the expected angle, but, due to several factors, among which the elastic rebound of the plate predominates, the metal sheet must be withdrawn from the press in order to measure the bending angle which has been obtained.

The principal systems nowadays in use for adjusting the angle of bend provide either for the adjustment of the stroke of approach between the die and the punch as a function of the thickness of the plate being processed, of the width of the V-groove of the die and other factors, or the setting of end of stroke abutments which establish accurately determined positions between the die and the punch.

Such systems are not satisfactory since they require the preparation of trial pieces prior to making the prototype of a series, do not exclude errors in bending due to even small variations of the thickness of the plate, to variations of the mechanical properties of the plates and different elastic rebound according to the direction of rolling of the metal sheet to be bent, and thus involve the necessity of a continuous control of the as-obtained angle of bend.

An object of the present invention is thus that of redressing the defects of the conventional systems by providing a device for measuring the angles of bend which, even permitting the same possibilities of adjustment of the conventional systems, makes possible a continuous and immediate measurement during the bending operation itself in order to be enabled to check at any instant of time the operation of the press and promptly to take action with appropriate correction without removing the workpiece being processed from the press.

In order that such a purpose may be attained, the invention provides a device for the detection of the angle of bend in bending presses for sheet metal which comprise a die with a resting plane through which a groove is formed longitudinally, the edges of the groove being radiussed with a certain radius of curvature to said resting plane, a punch having a pointed edge in the form of a counter-V and means adapted to effect movement of the die and the punch towards and away of one another in a direction perpendicular to the resting plane of the die so that the counter-V point of the punch remains in the central plane of symmetry of the die groove, such a device being characterized in that it comprises a detecting member equipped with a head, said detecting member being arranged in a linearly displaceable manner in a guideway formed in the die and which is extended from a point of the die groove on the plane of symmetry of the groove perpendicularly to the resting plane, the head of the detecting member having, as formed in its front surface, a notch in alignment with the die groove and radiussed to the fresh surface of the head by edges having the same radius of curvature of the groove edges, resilient means active between the die and the detecting member to displace the latter in its guideway in such a direction as to have said member exiting the die groove, stop means for maintaining the detecting member in an inactive position, and means cooperating with the detecting member and adapted to convert its linear displacement into a command or indicative signal of the angle of bend of the plate being processed.

The inactive position of the detecting member can thus be so selected that in such a position the front surface of the detecting head is on the resting plane of the die, or slightly thereabove.

By virtue of the arrangement of the detecting member and the configuration of the notch (for example a V-shaped notch) formed on its head, the linear displacement undergone by the detecting member during the bending operation of a plate, is exactly proportional to the angle of bend of the metal sheet as it is progressively attained. The indicative signal delivered by such means cooperating with the detecting member makes thus possible to have a continuous check and possibly the control and the adjustment of the bending operation.

These means which cooperate with the detecting member can be of a various nature: for example they can be a control electromagnetic valve, or an angular detector of the resolver type coupled to the detecting member by means of a rack-and-pinion couple. There can be used, as an alternative, also known means such as electric detectors of the potentiometer class, linear transducers, magnetic or optical detectors and the like, which may also dispense with mechanical transmissions of the rack-and-pinion type.

The signals delivered by such means and which indicate at every instant of time the angle of bend of the metal sheet being processed can variously be processed by electronic systems which are known per se and can be used for controlling the means which originate the movements of the die and the punch of the bending press relative to one another.

The detecting device according to the invention will be more detailedly described hereinafter in connection with an exemplary embodiment which is diagrammatically shown in the accompanying drawings.

In the drawings:

FIG. 1 diagrammatically shows, in side elevational view, a plate bending press incorporating the detecting device.

Figure 5:
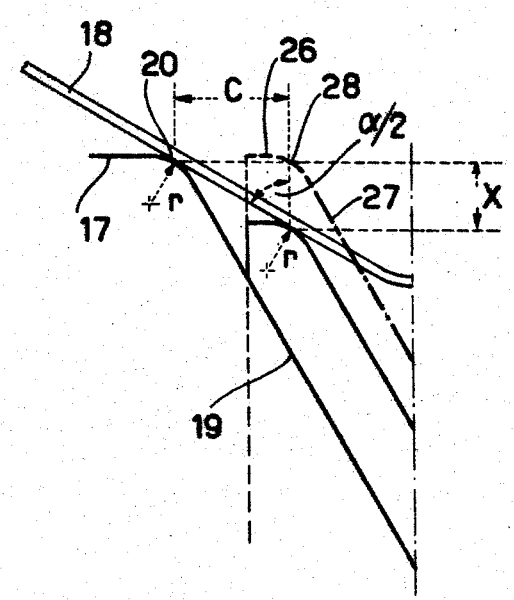

FIG. 5 disgrammatically shows a detail of the detecting device.

Figure 1:
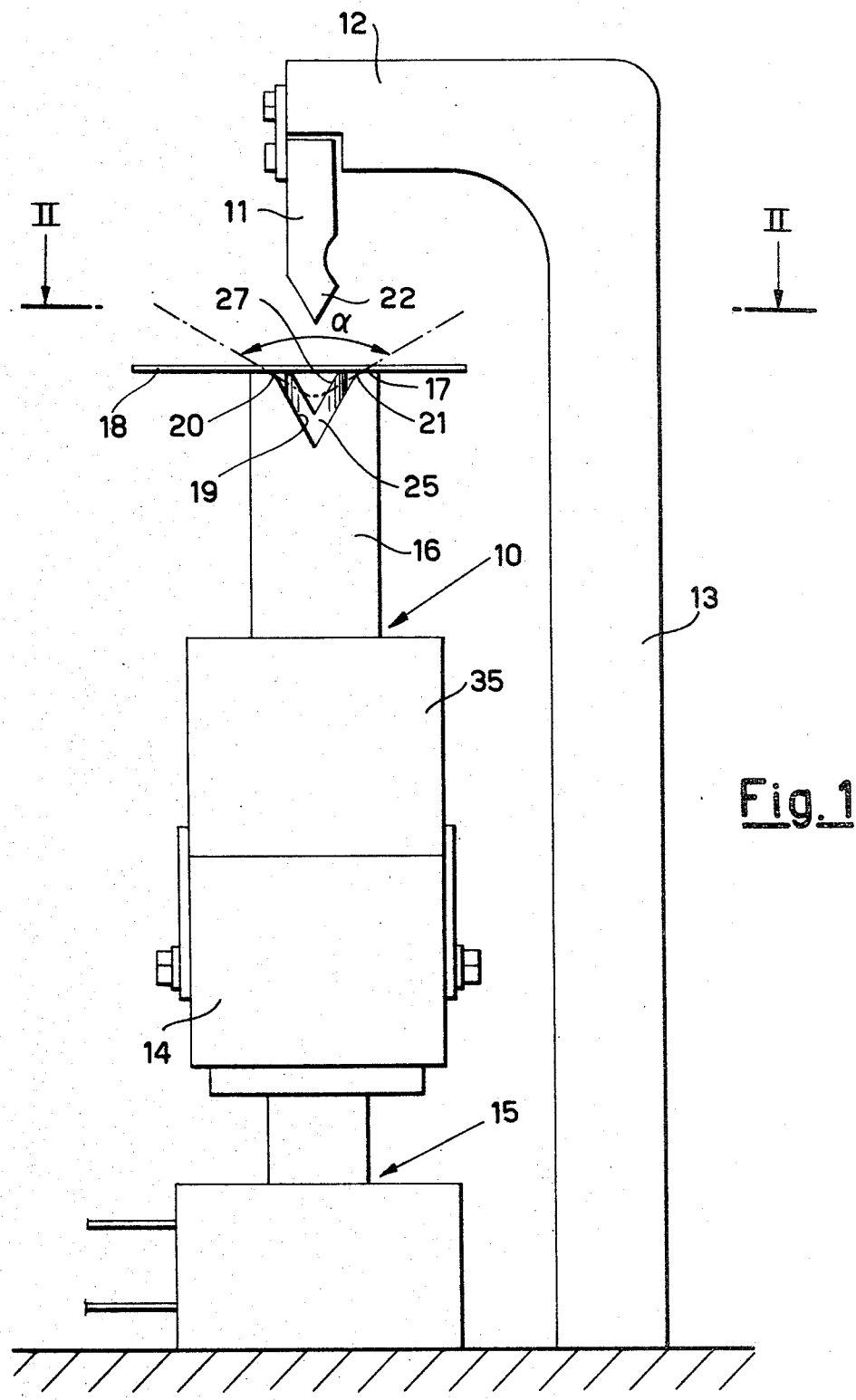
Figure 2:
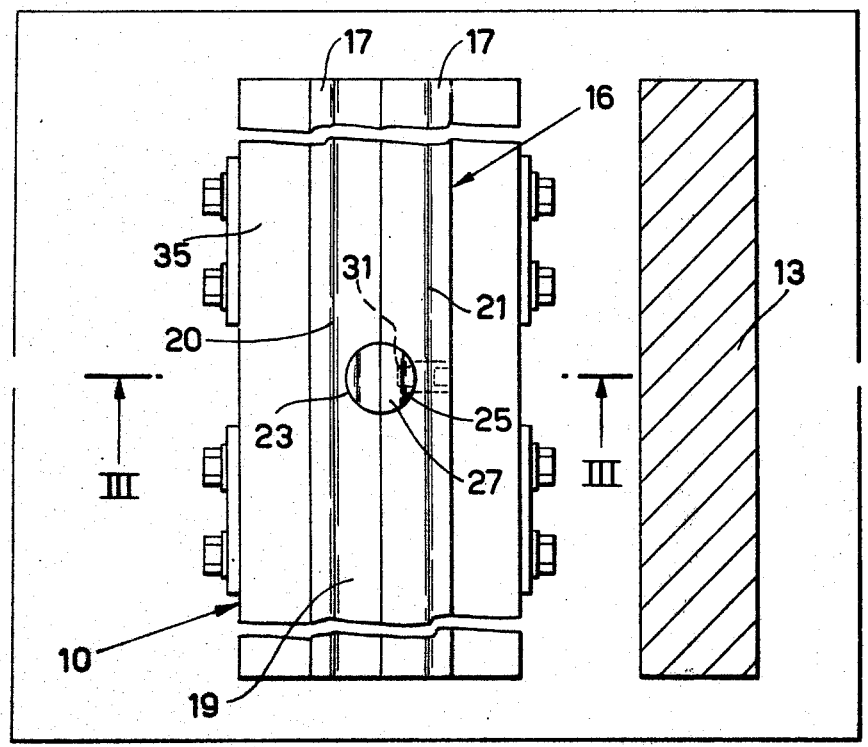
FIG. 2 is a top plan view of the same bending press.

Having now reference to FIGS. 1 and 2, it can be seen that the bending press to which the subject detecting device is applied comprises a die block, generally indicated at 10 and a punch 11.

In the example shown, the punch 1 is mounted fixedly and overhangingly on an arm 12: the latter is integral with a press upright 13. Conversely, the die block 10 is mounted on a body 14 which can either be lifted or depressed relative to the press bedplate, by the agency of jacks 15.

It should be noticed that bending presses of the kind referred to herein are well known in the art and, inasmuch as the press as itself is not a part of the present invention, it has been shown in an extremely simplified form. In addition, it should be considered that, while in the example shown, the punch has been indicated as in fixed position with a movable die, the press could equally well be of the fixed die and movable punch type.

The die proper is composed by a prismatic body 16 which is arranged horizontally and can be obtained by assembling a number of aligned portions. The body 16 has, at its top, a resting plane 17 for a metal sheet 18 to be bent and such plane is interrupted by a groove 19 which extends longitudinally relative to the body 16 and which, in the example shown, has the shape of a "V" with edges 20, 21 radiussed to the resting plane 17. The radius of curvature of the edges 20, 21 is the same and is indicated on FIG. 5 by the letter "r".

The lower section of the punch 11 has a point 22 in the form of a "counter-V" which is exactly aligned on a vertical plane with the V-shaped groove 19 of the die 16 (see FIG. 1).

It is apparent that, by placing a planar metal sheet 18 on the resting plane 17 of the die 16 and by lifting then the entire die block 10 by the agency of the jacks 15, the plate 18 will contact the point 22 of the punch 11 and will be bent, as indicated in the dash and dot lines in FIG. 1. Thus, an angle of bend "alpha", indicated in FIG. 1, will be obtained and such an angle will be the narrower, the smaller the distance between the die and the punch will be.

The detecting device according to the invention has the task of detecting at every instant of time during the bending operation proper the angle of bend as it is being progressively reached.

Figure 3:
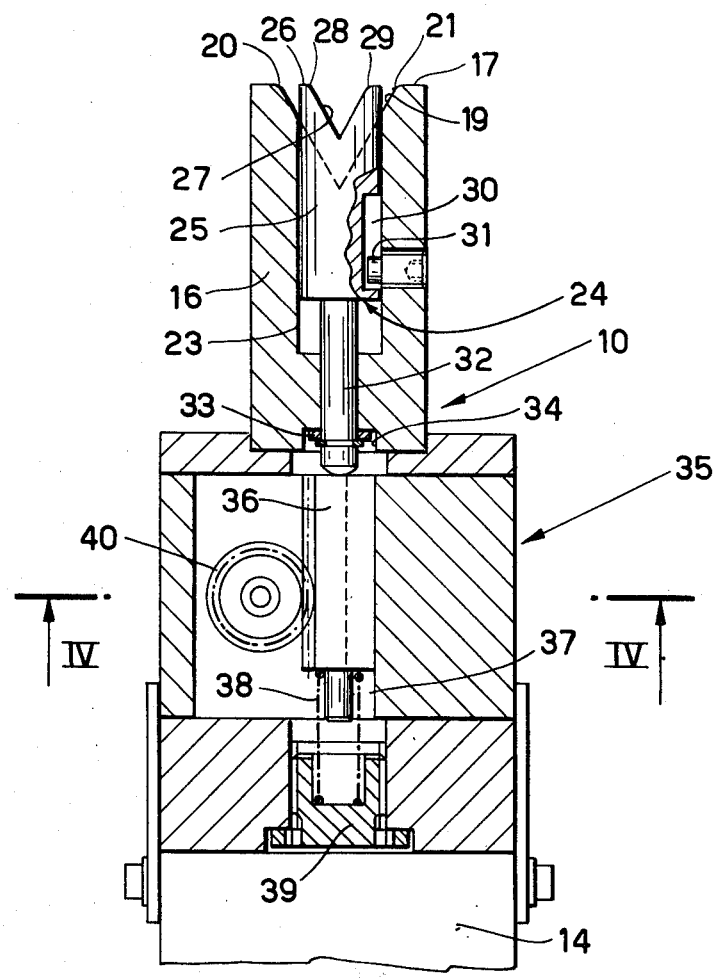
FIG. 3 is a cross-sectional view, taken along the line III—III of FIG. 2 which shows in greater detail the detecting device.
Figure 4:
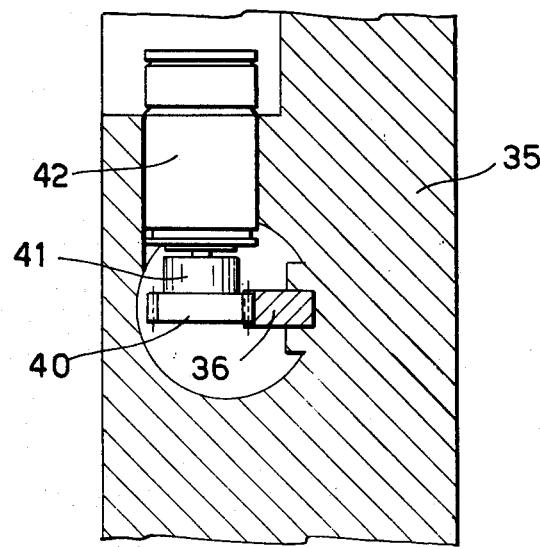
FIG. 4 is a cross-sectional view taken along the line IV—IV of FIG. 3.

Such a device will now be described in detail with particular reference to FIGS. 3 and 4.

The die body 16 has, at a certain point and preferably in its center, a bore 23 (see also FIG. 2) with its axis perpendicular to the resting plane 17 and lying on the plane of symmetry of the V-shaped groove 19. The diameter of the bore 23 is smaller than the width of the V-shaped groove 19. This bore 23 is a linear guideway for a detecting member 24 and, more exactly, for the head section 25 of said member. The head 25 has a front surface 26 through which a notch 27 is formed, the edges 28, 29 of which are radiussed to the front surface 26 with radii of curvature which exactly correspond to the radii of curvature of the edges 20, 21 of the groove 19 of the die 16. Also the shape of the notch 27 is equal to that of the groove 19 and thus, in the case in point, a V-shaped notch is provided. Laterally, the head 25 of the detecting member 24 has a longitudinal groove 30 for inserting therein a dowel 31 screwably affixed in the body 16 of the die so as to prevent any rotation of the detecting member 24 within its guideway bore 23 and also to limit its linear displacement. By virtue of the coupling between the groove 30 and the dowel 31, the detecting member 24 is held in such a position that its notch 27 is in true alignment with the groove 19 of the die.

The bottom portion of the detecting member 24 is extended into a shank 32 which carries a washer 33: the latter abuts a hollow space 34 formed through the body 16 of the die.

The die body 16 is mounted on another body, generally indicated at 35, which, for reasons of ease of construction, is made in a number of pieces through it is considered herein, for the sake of simplicity, as an entity.

In the body 35 there is arranged a rack 36 which can be displaced in a guideway 37 coaxial with the bore 23 of the body 16. At its top, the rack 36 contacts the bottom end of the shank 32 of the detecting member 24, while the bottom portion of the rack 36 is biassed by a spring 38, the spring being adjustable by the agency of a screw 39.

The spring 38 biases the rack 36 upwardly and concurrently also the detecting member 24, the latter being thus held in an inactive position as determined by the abutment of the washer 33 against the hollow space 34. In this position, the front surface 26 of the detecting member 24 lies on the same plane of the resting plane 17 of the die 16.

The rack 36 is in mesh with a pinion 40 which is affixed to the arbor 41 of an angular position detector of the resolver type, indicated generally at 42. The angular detector 42 is mounted in a specially provided seat of the body 35. This is a detector which is well known in the art and does not require more detailed elucidations: it is adapted to convert into an electric signal proportional to the angular width, the angle of rotation of its arbor 41 as a result of the linear displacement of the rack 36.

During the operation of bending a plate, starting from the position at which the planar plate rests on the resting plane 17 of the die 16 and thus also on the front surface 26 of the detecting member 24, which is coplanar therewith as outlined above, the plate, by being bent by the coaction of the die 16 and the punch 11, will push down the detector 24: the latter, in its turn, will linearly shift the rack 36 and the latter will consequently rotate through a certain angle the arbor 41 of the angular detector 42, so that a determined electric signal will be generated thereby. Inasmuch as, as it can easily be shown, the linear shift of the detecting member 24 is proportional to the bending angle of the plate, also the signal generated by the angular position detector will be proportional to such an angle and will thus deliver an indication of the angle itself.

The plate 18 which is being bent will rotate about the edges 20, 21 of the V-shaped groove 19 of the die 16 and will rest on such edges. Likewise, the plate remains resting against the edges 28, 29 of the V-shaped notch 27 of the detecting member 24, so that the latter is thrust down against the bias of the spring 38.

Now, the condition which is required for the displacement of the detecting member to be proportional to the angle of bend is that the radii of curvature of the edges 20, 21 of the groove 19 be equal to those of the edges 28, 29 of the notch 27.

As a matter of fact, as shown in FIG. 5, in this case, if "r" connotes the common radius of curvature, "c" the constant distance, on the planes parallel to the resting plane 17 of the die, of corresponding points on the edges 20 and 28, respectively, of the groove 19 and the notch 27, and "x" indicates the linear shift of the detecting member 24 which corresponds to a determined angle of bend "alpha", now the result is that $$x = c \cot \tfrac{1}{2} \text{alpha}$$

This is then the relationship which binds the linear shift of the detecting member to the angle of bend and, since the value of "c" is a constant, it can be seen that such a shift is directly proportional to the cotangent of ½alpha, and, eventually, to the angle of bend.

The signal delivered by the angular detector 42 can variously be exploited. For example, it can so visually displayed as to be enabled to check, during the bending operation and at every instant of time, the angle of bend which has been reached. Such a signal can also be exploited for commanding the stoppage of the bending operation as an expected angle of bend has been attained. In addition to the stoppage of the bending operation, it is likewise possible to command a feed-back movement of the die and the punch in order to check the resilient return of the metal sheet.

As can be seen, by properly processing and exploiting the signal delivered by the detecting device, the bending operation can be rendered automatic without withdrawing the plate from the press.

It has been said hereinbefore that the conversion of the displacement of the detecting member into a processable signal may also take place with the most varied means which can dispense with the mechanical transmission through the rack-and-pinion couple.

Lastly, it should be noted that the coplanarity of the resting plane of the die with the front surface of the detecting member when the latter is in its inactive position is by no means an essential for the satisfactory operation of the detector.

For reasons of convenience, the front surface 26 of the detecting member 24 in the at rest position of the latter can also jut slightly beyond the resting plane 17 of the die 16. If so, whenever a planar plate to be bent is positioned on the resting plane 17 of the die 16, the detecting member 24 is thrust down by the plate to take the machining-start operation in which the front surface 26 of the detector lies on the resting plane 17. Obviously, in such a case, it is required that the shift of the detecting member from its inactive position to that of machining-start be duly taken into account, since this displacement originates a signal which is to be neglected to the ends of the indication of the angle of bend.

The detecting device according to this invention has been disclosed with reference to an exemplary embodiment, it being understood that modifications and changes can be introduced therein, especially those of a practical and operational nature as regards constructional details without departing from the scope of this invention.

I claim:

1. A device for measuring the angles of bend in sheet metal bending presses of the kind comprising a die with a resting plate through which a longitudinal groove is formed the edges of which are radiussed with a determined radius of curvature to the resting plane, a punch having the shape of a "counter-V" and means adapted to effect movements of said die and said punch toward and away of one another in a direction perpendicular to the die resting plane so as to have the counter-V shaped point of the punch remaining on the central plane of symmetry of the die groove, characterized in that it comprises a detecting member equipped with a head, said detecting member being arranged in a linearly displaceable manner in a guideway formed through the die and which is extended from a point of the die groove on the plane of symmetry of the groove perpendicularly to the resting plane, the head of the detecting member having, as formed on its front surface, a notch aligned with the die groove and radiussed to the front surface of the detector head by edges having the same radius of curvature as the edges of the V-shaped die groove, resilient means active between the die and the detecting member for displacing the latter in its own guideway in the sense of having it exiting the V-shaped die groove, stopping means for keeping the detecting member in an inactive position, and means, cooperating with the detecting member, which are adapted to convert the linear displacement thereof into a command or signal of indication of the angle of bend of the metal sheet undergoing bending.

2. A detecting device according to claim 1, characterized in that the die groove and the notch of the detecting member have a V-shaped outline with the same angular aperture.

3. A detecting device according to claim 1, characterized in that the detecting member is composed by a cylindrical body, means being additionally provided to prevent rotations of such body in its guideway in the die.

4. A detecting device according to claim 3, characterized in that said means are composed by a laterally positioned dowel which enters a longitudinal hollow space formed laterally of the detecting member.

5. A detecting device according to claim 1, characterized in that the means which cooperate with the detecting member convert the displacement of said member into an electric voltage which is proportional to such a displacement.

6. A detecting device according to claim 1, characterized in that the detecting member directly energized a control member.

* * * * *